3,122,530
WATER-SOLUBLE TRIAZINE DYESTUFFS HAVING A THIOCYANATO SUBSTITUENT ON THE TRIAZINE RING, AND AN AZO, ANTHRAQUINONE, OR PHTHALOCYANINE CHROMOPHORIC GROUP
Raymond Price and Cyril Eric Vellins, Manchester, England, assignors to Imperial Chemical Industries Limited, London, England, a corporation of Great Britain
No Drawing. Filed Feb. 6, 1959, Ser. No. 791,529
Claims priority, application Great Britain Feb. 12, 1958
2 Claims. (Cl. 260—146)

This invention relates to new dyestuffs, and more particularly it relates to new dyestuffs capable of entering into reaction with materials containing hydroxyl and amino groups, especially vegetable and animal textile materials, thus producing coloured materials having very good fastness to washing.

We have found that s-triazines containing a halogen atom on one carbon atom of the nucleus and a thiocyanato group on at least one of the other carbon atoms of the nucleus will react with water-soluble coloured amino compounds which have a reactive hydrogen atom in the amino group, hydrogen halide being eliminated, and that the resultant water-soluble compounds containing a thiocyanato-triazinylamino group will colour materials containing amino or hydroxyl groups in shades having a very good fastness to washing, especially when the colouration process incorporates a treatment of the material with an alkali.

Thus according to the invention there are provided, as new dyestuffs, the water-soluble coloured amino compounds wherein the amino group is substituted by a s-triazine group containing at least one thiocyanato group attached to a carbon atom thereof.

The new dyestuffs may contain one or more of the thiocyanato-triazinylamino groups. Each triazine nucleus will be substituted on one of the carbon atoms by the nitrogen atom which links the triazine nucleus to the remainder of the dyestuff molecule and will be substituted on a second carbon atom by a thiocyanato group. The third carbon atom may carry a wide range of substituents, for example lower alkyl, aryl, halogen, such as chlorine and bromine, or etherified hydroxyl groups such as phenoxy and lower alkoxy groups. Preferably however, the third carbon atom of the triazine nucleus carries a thiocyanato group, so that the triazine nucleus is substituted by two thiocyanato groups.

The nitrogen atom linking the triazine nucleus to the remainder of the dyestuff molecule may contain other substituents, advantageously a substituent of the formula:

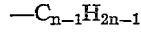

wherein $n$ is a whole positive number, preferably a number of from 1 to 5.

The dyestuffs in which the triazine nucleus is linked in this manner may be represented by the formula:

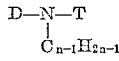

wherein D represents the radical of a water-soluble dyestuff, T represents a s-triazine ring containing at least one SCN group and $n$ has the meaning given above.

Preferably, T represents a 2:4-dithiocyano-6-s-triazinyl group.

In general, the nitrogen atom linking the triazine group to the remainder of the dyestuff molecule is attached to a carbon atom, for example a carbon atom of an alkyl chain or a carbon atom in an aryl nucleus.

The chromophoric system present in the new dyestuffs may be that of any of the known dyestuff series, for example of the stilbene, azine, dioxazine and o-nitrodiarylamine series and more particularly of the anthraquinone, phthalocyanine and, preferably, the azo series, including metal-free and metalliferous monoazo and polyazo dyestuffs. The chromophoric systems of more than one series may be present, for example there may be present both the azo and anthraquinone or both the azo and stilbene chromophores.

The new dyestuffs may be solubilised by the presence of strongly acid anionic groups such as sulphonic acid groups or carboxylic acid groups and alternatively or additionally by groups of lower acidity such as hydroxyl sulphamyl and lower alkyl sulphone groups.

The new dyestuffs may be obtained as indicated above by reacting together on the one hand a s-triazine containing at least one halogen atom, preferably chlorine, and at least one thiocyanato group, and on the other hand a water-soluble coloured amino compound which contains a reactive hydrogen atom attached to the amino group. This process forms a further feature of the invention.

In general, the reaction is preferably carried out in solution or suspension in an organic polar liquid which is substantially free from water. Exceptions occur, however, when water, or mixtures of water with these organic polar liquids, may be used satisfactorily as the reaction medium. Suitable organic polar liquids include, for example, acetone, dioxan and 2-ethoxyethanol.

Suitable s-triazines for use in the above process may be obtained by reacting a s-triazine containing at least two halogen atoms for example cyanuric chloride, 2-methoxy-4:6-dichloro-s-triazine, 2-phenoxy-4:6-dichloro-s-triazine, 2-methyl-4:6-dichloro-s-triazine or 2-phenyl-4:6-dichloro-s-triazine, with an alkali metal thiocyanate, particularly potassium thiocyanate, in an organic polar liquid, especially acetone, the liquid being preferably substantially free from water. The preferred s-triazine is 2:4-dithiocyano-6-chloro-s-triazine.

In carrying out the process of the invention any water-soluble amino compound containing at least one reactive hydrogen atom in the amino group may be used. The manufacture of such compounds is well known from the art. Thus suitable aminoazo compounds may be obtained for example, by use of a coupling component containing an amino group where in there is present a reactive hydrogen atom.

Into this category there fall:
(1) The aminoazo compounds obtained by coupling diazotised aromatic amines with para-coupling amines of the benzene and naphthalene series, such as aniline,
o- and m-toluidines,
2:5-dimethylaniline,
o- and m-anisidines,
2:5-dimethoxyaniline,
2-methoxy-5-methylaniline,
anthranilic acid,
o- and m-aminoacetanilides,
m-phenylene diamine,
m-dimethylaminoaniline,
3-amino-4-methylacetanilide,
3-benzoylaminoaniline,
2-amino-4-methoxyacetanilide,
2-amino-4-methylacetanilide,
3-amino-N-methylacetanilide,
1:6- and 1:7-naphthylamine sulphonic acids,
2-methoxy-1:6- and 1:7-naphthylamine sulfonic acids and the N-lower alkyl derivatives of these such as
N-methylaniline,
N-ethyl-o-toluidine,
m-methylamino-acetanilide,
4-methyl-3-methylamino-acetanilide,
N-ethyl-m-toluidine, N-methyl-2-methoxy-5-methylaniline,
N-propyl-m-anisidine and N-butylaniline;

(2) The aminoazo compounds obtained by coupling diazotised aromatic amines with aminonaphthols such as 1:8-aminonaphthol-6-sulphonic acid,
1:8-aminonaphthol-3:6- and 4:6-disulphonic acids,
2:5-aminonaphthol-7-sulphonic acid,
2:8-aminonaphthol-6-sulphonic acid,
2-amino-1-chloro-8-naphthol-6-sulphonic acid,
2:5-aminonaphthol-1:7-disulphonic acid,
2:8-aminonaphthol-3:6-disulphonic acid,
3-carboxy-2:8-aminonaphthol-6-sulphonic acid and their N-lower alkyl, N-(aminoaryl) and N-(aminoacyl) derivatives such as 1-ethylamino-8-naphthol-3:6-disulphonic acid,
1-butylamino-8-naphthol-3:6-disulphonic acid,
2-methylamino-5-naphthol-7-sulphonic acid,
2-methylamino-8-naphthol-6-sulphonic acid,
1-(3'-aminobenzoylamino)-8-naphthol-3:6-and 4:6-disulphonic acids,
1-(4'-aminobenzoylamino)-8-naphthol-3:6- and 4:6-disulphonic acids,
1-(3'-aminobenzoylamino)-8-naphthol-6-sulphonic acid,
1-(3'-aminobenzoylamino)-8-naphthol-2:4-disulphonic acid,
2-(4'-aminobenzoylamino)-5-naphthol-7-sulphonic acid,
2-(3'-aminobenzoylamino)-8-naphthol-6-sulphonic acid,
2-(3'-aminophenylamino)-5-naphthol-7-sulphonic acid,
1-(3'-aminophenylamino)-8-naphthol-3:6- and 4:6-disulphonic acids and
2-(4'-aminophenylamino)5-naphthol-3':7-disulphonic acid.

(3) The aminoazo compounds obtained by coupling diazotised aromatic amines with amino compounds which contain an enolised or enolisable ketomethylene group, such as 3-aminoacetoacetanilide, 4-aminobenzoylacetanilide, and preferably, pyrazolones such as 1-(3'- and 4'-aminophenyl)-3-methyl-5-pyrazolones, 1-(3'-amino-4'-sulphophenyl)-3-methyl-5-pyrazolone, 1-(4'-amino - 3' - carboxyphenyl)-3-methyl-5-pyrazolone and the 3-carboxy-5-pyrazolones, 3-carbamyl-5-pyrazolones and 3-lower carbalkoxy-5-pyrazolones corresponding to these 3-methyl-5-pyrazolones.

As examples of aromatic amines whose diazo compoments may be coupled with the various types of coupling components described in the paragraphs numbered (1) to (3) above there may be mentioned diazotisable amines of the benzene series, for example aniline, o-, m- and p-toluidines, o-, m- and p-anisidines, m- and p-nitroanilines, m- and p-aminoacetanilides, orthanilic acid, metanilic acid, sulphanilic acid, aniline-2:4-, 2:5- and 3:5-disulphonic acids, 4-methylaniline-2-sulphonic acid, 5-methylaniline-2-sulphonic acid, 2-methylaniline-5-sulphonic acid,
2:4-dimethylaniline-6-sulphonic acid,
4-methylaniline-2:5-, 3:5-, and 2:6-disulphonic acids,
2-methylaniline-4:6-disulphonic acid,
5-chloro-2-aminanisole, 4-methoxyaniline-2-sulphonic acid,
5-methoxyaniline-2-sulphonic acid,
2-methoxyaniline-5-sulphonic acid,
2:4-dimethoxyaniline-6-sulphonic acid,
4-chloroaniline-2-sulphonic acid,
4:5-dichloroaniline-2-sulphonic acid,
2:5-dichloroaniline-4-sulphonic acid,
4-acetylaminoaniline-2-sulphonic acid,
5-acetylaminoaniline-2-sulphonic acid,
2-trifluoromethylaniline, 4-trifluoromethylaniline-2-sulphonic acid,
4-chloro-5-methylaniline-2-sulphonic acid,
3-chloro-2-methylaniline-4:6-disulphonic acid,
5-chloro-4-methylaniline-2-sulphonic acid,
4-nitroaniline-2-sulphonic acid,
5-nitroaniline-2-sulphonic acid,
4-nitro-2-methoxyaniline-5-sulphonic acid,
5-amino-2-methylacetanilide-4-sulphonic acid,
aniline-2-, -3- and -4-carboxylic acids and esters of these such as methyl and butyl anthranilates, 2-aminophenol,
2-aminophenol-4-sulphonic acid,
2-aminophenol-4:6-disulphonic acid,
4-ethanesulphonyl-2-aminophenol, 3-amino-4-hydroxyacetophenone, 4-nitro-2-aminophenol-6-sulphonic acid,
6-nitro-2-aminophenol-4-sulphonic acid,
4-chloro-2-aminophenol-6-sulphonic acid,
6-chloro-2-aminophenol-4-sulphonic acid, 4- and 5-nitro-2-aminophenols, 4:6-dinitro-2-aminophenol, 4-chloro-2-aminophenol, 4-sulphamyl-2-aminophenol, 4-methylsulphamyl-2-aminophenol, 4- and 5-sulpho-2-aminobenzoic acids, aminoterephthalic acid, 4-amino-isophthalic acid, 5-nitro-2 - aminophenoxyacetic acid, 5-chloro-2-aminobenzoic acid, 5-nitro-2-aminobenzoic acid, 2-sulphamylaniline, 2-ethylsulphamylaniline, 2-aminophenylethylsulphone, 4- and 5-aminosalicylic acids;

Diazotisable amines of the naphthalene and other fused ring series such as 1- and 2-naphthylamines, 1-naphthylamine-4-, 5-, 6- and 7-monosulphonic acids, 2-naphthylamine-1, 6-, 7- and 8-monosulphonic acids, 1-naphthylamine-2:4-, 2:5-, 3:6- and 3:8-disulphonic acids, 2-naphthylamine-1:5-, 3:6-, 4:8-, 5:7- and 6:8-disulphonic acids, 1-naphthylamine-2:4:6- and 2:5:7-trisulphonic acids, 2-naphthylamine-1:5:7- and 3:6:8-trisulphonic acids, 2-methoxy-1-naphthylamine-6- and -7-sulphonic acids, 1-amino-2-naphthol-4-sulphonic acid, 1-amino-6-nitro-2-naphthol-4-sulphonic acid, 1- and 2-aminoanthraquinones, 1-aminopyrene monosulphonic acid, 3-aminochrysene-sulphonic acid;

Diazotisable amines containing more than one unfused phenyl ring such as 4-aminodiphenyl-3- and 4'-sulphonic acids, 4'-nitro-4-aminostilbene-2:2'-disulphonic acid, 4'-acetylamino-4-aminostilbene - 2:2' - disulphonic acid, 4'-benzoylamino-4-aminostilbene-2:2'-disulphonic acid, 4'-chloro-4-aminostilbene-2:2'-disulphonic acid, 4'-bromo-4-aminostilbene-2:2'-disulphonic acid, 4'-dimethylamino-4-aminostilbene-2:2'-disulphonic acid, 4'-anilino-4-aminostilbene-2:2'-disulphonic acid, 2-amino-2'-methyldiphenyl ether, 2-amino-2'-methyldiphenylether-4'-sulphonic acid, 2 - aminodiphenylsulphone, 4 - aminodiphenylamine, 4-amino-4'-nitrodiphenylamine-2'-sulphonic acid, 3- and 4-aminobenzanilides, 3'- and 4'-aminobenzanilides, 3'- and 4'-aminobenzanilides-3- and -4-sulphonic acids;

And heterocyclic amino compounds such as 4-, 5- and 6-aminoindazoles, 6-amino-5-methoxy-2-(4'-sulphophenyl)benz-1:2:3-triazole, 6-methyl-2-(4'-aminophenyl)benzthiazole, and its mono- and di-sulphonation products, 2-(4'-aminophenyl)naphtha-1:2:3-triazole-3':5 -disulphonic acid, 2-(3'- and 4'-aminophenyl)naphtha-1:2:3-triazole-4:7:9-trisulphonic acids, 2 - (4'-aminophenyl)naphtha-1:2:3-triazole-3':4:7:9-tetrasulphonic acid, 5 - nitro - 2-aminothiazole and 3-aminopyridine. Many of the aminoazo compounds so obtained and also other aminoazo compounds suitable for use in the process of the invention may be obtained by the use of diazo and/or coupling components containing groups, such as nitro or acylamino groups, which are convertible to amino by known methods, followed by such treatment as is necessary to convert these groups to amino groups.

Thus in place of the aminonaphthols or aminopyrazolones or their N-alkyl derivatives whose use is described in the paragraphs (2) and (3) above, there may be used N-acyl derivatives of these, particularly the N-acetyl or the N-formyl derivatives, the free aminoazo compound being obtained by subsequent hydrolysis.

Also into this category fall the use of the aminoazo compounds obtained starting from diazo components containing nitro or acylamino groups and coupling components which may be free from amino groups or which may contain an amino group or a nitro or acylamino group, so that there is obtained an azo compound having more than one amino group. As examples of diazo components suitable for this process there may be mentioned 3- and 4-aminoacetanilides, 3-aminoacetanilide-4-sulphonic acid, 4 - aminoacetanilide - 3 - sulphonic acid, 4-amino-3-nitroacetanilide, 5-amino-2-methylacetanilide-4-sulphonic acid, 4'-acetylamino-4-aminostilbene-2:2'-disulphonic acid, 4-acetylamino-4'-aminodiphenyl, 4-acetylamino-4'-amino-3:3'-dimethoxydiphenyl, 4-amino-1-acetylaminonaphthalene-6-sulphonic acid, m- and p-nitroaniline, 4-nitroaniline-2-sulphonic acid, 4-nitro-2-methoxyaniline-5-sulphonic acid, 4-nitro-2-chloroaniline-4-nitroaniline-3-carboxylic acid, 5-nitroaniline - 2 - sulphonic acid, 4-nitro-2-aminophenol-6-sulphonic acid, 6-nitro-2-aminophenol-2-sulphonic acid, 4- and 5-nitro-2-aminophenols, 5-nitro-2-aminophenoxyacetic acid, 4-nitroaniline-2-carboxylic acid, 6-nitro-1-amino-2-naphthol-4-sulphonic acid and 4-nitro-4-aminostilbene-2:2'-disulphonic acid.

These diazo components may be coupled with the type of coupling components described in paragraphs numbered (1) to (3) above and the resultant product converted to a diamino-azo compound by hydrolysis or reduction as necessary. Similarly, the use of these diazo components with coupling components containing acylamino groups or nitro groups leads to azo compounds containing more than one amino group.

Monoamino azo compounds may be obtained from these diazo components by this method by using coupling components which are free from amino, nitro or acylamino groups. In this manner there may be used dialkylanilines, such as diethylaniline and dihydroxyethylaniline; naphthols such as 1- and 2-naphthols, 1-naphthol-4-sulphonic acid, 2-naphthol-6- and 8-sulphonic acids, 1- and 2-naphthol-3:6-disulphonic acids, 2-naphthol-6:8 disulphonic acid 1-naphthol-3:6:8-trisulphonic acid, 8-ethoxy-1-naphthol-3:6-disulphonic acid, 1:5-dihydroxynaphthalene-2-sulphonic acid and 1:8-dihydroxynaphthalene-2:4- and 3:6-disulphonic acids. There may also be used dialkylamino- and arylamino-naphthols (that is to say, substituted aminonaphthols which do not contain an acylatable hydrogen atom on the amino group) such as 1-phenylamino-8-naphthol-3:6- and 4:6-disulphonic acids, 1-phenylamino-8-naphthol-4-sulphonic acid, 2-dimethylamino-8-naphthol-6-sulphonic acid, 2-(4'-carboxyphenylamino)-8-naphthol-6-sulphonic acid, 2-(3'-sulphophenylamino)-5-naphthol-7-sulphonic acid, and 2-dimethylamino-5-naphthol-7-sulphonic acid.

There may also be used coupling components which couple owing to the presence of an enolised or enolisable keto-methylene group, especially pyrazolines such as 1-phenyl - 3-methyl-5-pyrazolone, 1-(4'-sulphonphenyl)-3-methyl - 5-pyrazolone, 1-(6'-chloro-3'-methyl-4'-sulphophenyl) - 3-methyl-5-pyrazolone, 1-(2':5'-dichloro-4-sulphophenyl) - 3 - methyl-5-pyrazolone, 1-(2':5'-disulphophenyl) - 3-methyl-5-pyrazolone, 1-(4'-ethoxy-2'-sulphophenyl) - 3-methyl-5-pyrazolone, 1-(4'-carboxyphenyl)-3-methyl-5-pyrazolone, and the 3-carboxy-5-pyrazolones, 3-carbamyl-5-pyrazolones and 3- lower carbalkoxy-5-pyrazolones corresponding to these 3-methyl-5-pyrazolones.

If, in place of the diazo components listed in the above paragraphs there are used diazo components which already contain an azo group, there are obtained amino bisazo dyestuffs which are suitable for use in the process of the invention. As suitable diazo components of this type there may be mentioned 4-aminoazobenzene-3:4'-sulphonic acid and also the aminoazo compounds obtained as discussed in the preceeding paragraphs.

Where the amino azo and amino bisazo compounds contain groups capable of forming metal complexes, for example o:o'-dihydroxyazo groupings, o-hydroxy-o'-carboxyazo grouping (where one of the hydroxyls may be part of an enolised ketone group as in an azo-pyrazolone) and o-hydroxycarboxylic acid groupings (as in a salicylic acid radical), they may first be converted to the corresponding metal-complex, preferably a 1:1-copper complex or a 1:1- or a 1:2-chromium or cobalt complex, before their use in the process of the invention.

Amino-anthraquinone compounds suitable for use in the process of the invention include those containing an acylatable amino group directly attached to the anthraquinone nucleus and also those containing the acylatable amino group in an external aryl nucleus, as, for example in an aminophenylamino group bound to an alpha position of the anthraquinone, and those containing the acylatable amino group in an alkyl substituent. Among the anthraquinone dyestuffs there are included not only those dyestuffs which contain an unchanged anthraquinone nucleus, but also those which are generally known as anthraquinone dyestuffs, for example 10-ketoanthracene compounds in which there is present a 5- or 6-membered heterocyclic ring fused across the 1 and 9 positions of the anthracene nucleus, for example 1:9-anthrapyridones, 1:9-anthrapyrimidines, and 1:9-anthrapyrazoles.

As examples of these anthraquinone compounds there may be mentioned 1:4- and 1:5-diaminoanthraquinone-2-sulphonic acids and preferably 1-amino-4-(aminoarylamino) - 2-sulphoanthraquinones optionally containing sulphonic acid groups in any of the 5, 6, 7, or 8 positions of the anthraquinone nucleus and in the aryl nucleus, as are obtained, for example, by condensing a 4-halogeno-1-amino-2-sulphoanthraquinone or a 5-, 6-, 7- or 8-sulphonic acid derivative thereof, with a diaminoaryl compound such as m- or p-phenylenediamine, 1:3-phenylenediamine-4-sulphonic acid, 1:4-phenylenediamine-3-carboxylic and sulphonic acids, 4:4'-diaminodiphenyl-3-sulphonic acid, 4:4'-diaminoazobenzene-2-sulphonic acid, p-methylaminoaniline and 4 - methylaminoaniline-3-carboxylic and sulphonic acids.

Aminophthalocyanines suitable for use in the process of the invention include those containing the acylatable amino groups directly attached to the phthalocyanine nucleus and also, more particularly, those in which the acylatable amino group is attached to a pendant aryl, preferably phenyl nucleus. For ease of synthesis, above all are preferred those in which a sulphonated aminophenyl nucleus is attached through a sulphamyl group to a metal, preferably a copper, phthalocyanine nucleus. These may be obtained by reacting a phthalocyanine polysulphonchloride with a phenylene diamine sulphonic acid and, if desired, hydrolysing any residual sulphonchloride groups.

The new dyestuffs may be stabilised against decomposition during storage by the addition of buffers which give an aqueous solution of pH about 5 to 8. Suitable buffers for this purpose include, for example, those obtained from inorganic acids such as mixtures of water-soluble acid salts of phosphoric acid, especially the alkali-metal acid salts, and also those from organic non-acylatable amine sulphonic acids, for example mixtures of diethylamino benzene sulphonic acids with their alkali metal salts.

The buffers may be mixed with the dried dyestuff or may be added to the dyestuff paste before drying.

The proportion of buffer added in this way may be from about 2% to 80% by weight of the resultant dyestuff composition, and is preferably about 10% by weight of the dyestuff composition.

The new dyestuffs are valuable reactive dyestuffs for textile materials containing amino groups, such as leather and animal and superpolyamide fibres, which may be dyed and printed by the application thereto of the new dyestuffs in aqueous medium under weakly alkaline, neutral or acidic conditions, and more particularly for textile materials containing hydroxyl groups, such as cotton, linen and viscose rayon, which may be dyed and printed by carrying out the colouration process using the dyestuff in aqueous medium in conjunction with a treatment with an alkaline substance such as sodium bicarbonate, potassium carbonate or caustic soda.

The coloured materials so obtained are characterised by their fastness to washing. It is believed that reaction occurs between the dyestuff and the material coloured, since the dyestuff cannot be extracted from the coloured material by organic solvents for example, pyridine, in which the dyestuff itself is readily soluble, and which normally can be used to extract water-soluble dyestuffs such as "acid" dyestuffs for wool or "direct" dyestuffs for cotton from materials dyed therewith.

If the dyestuffs contain groups forming metal complexes, for example, o:o'-dihydroxyazo and o-hydroxy-o'-carboxyazo groupings, or o-hydroxycarboxylic acid groupings as in a salicylic acid residue, the dyeings obtained may be treated with metal-yielding agents, for example, chromium-yielding agents and, preferably, copper-yielding agents.

The invention is illustrated but not limited by the following examples in which parts and percentages are by weight:

*Example 1*

A solution of 19.4 parts of dry potassium thiocyanate in 240 parts of acetone is added gradually at 15° C. to a well stirred solution of 18.45 parts of cyanuric chloride in 190 parts of acetone. The mixture is stirred for 30 minutes, filtered and the potassium chloride on the filter is washed with a little acetone. To the solution of 2-chloro-4:6-dithiocyano-s-triazine so obtained there is added a suspension in 400 parts of Cellosolve of 46.5 parts of the disodium salt of 2-(4'-amino-2'-methylphenylazo)naphthalene-4:8-disulphonic acid, the aminoazo compound obtained by coupling diazotised 2-naphthylamine-4:8-disulphonic acid with m-toluidine, and the mixture is stirred for 1 hour. 8.4 parts of sodium bicarbonate are added and stirring is continued for a further 18 hours when no free aminoazo compound can be detected in the reaction mixture. This is shown by spotting a test portion on filter paper with 30% acetic acid when no pink colour develops. The insoluble matter is filtered off, washed with acetone, and dried. The azo dyestuff so obtained contains no combined chlorine, and the sulphur content is equivalent to 3.8 atoms per azo link, indicating that there are two thiocyanato groups attached to the triazine ring.

When cotton fabric is padded with a 2% solution of this dyestuff, dried and then treated with 0.5% caustic soda solution saturated with salt and subsequently steamed for 1 minute, yellow dyeings are obtained with good fastness to washing and to light.

*Example 2*

To a solution in 1,500 parts of water of 60 parts of the trisodium salt of the copper complex of 2-amino-6-(2'-hydroxyphenylazo)-5-naphthol-3':5':7-trisulphonic acid, the compound obtained by coupling diazotised o-aminophenol-4:6-disulphonic acid with 2-amino-5-naphthol-7-sulphonic acid and heating the product with copper sulphate, there is added a solution of 2-chloro-4:6-dithiocyanotriazine, obtained as described in Example 1, the temperature of the reaction mixture being maintained at 10° C. by means of external cooling and the pH at 7 by the addition of dilute sodium carbonate solution. After stirring the mixture for 5 minutes the product is isolated by drowning in acetone and filtering. The filter cake is washed with acetone, then mixed with 8 parts of a mixture, in the ratio of 15:1 by weight, of sodium-N:N-diethylmetanilate and sodium hydrogen sulphate and dried at 60° C.

When cotton fabric is padded with a solution of the dyestuff and alkali, dried and then steamed rubine shades are obtained.

The following table gives the shade of dyeings and prints obtained on textile materials by the dyestuffs obtained by condensing the aminoazo compound named with 2-chloro-4:6-dithiocyanotriazine in similar manner to the processes used in Examples 1 and 2.

| | Aminoazo compound | Shade |
|---|---|---|
| (3) | 1-(2':5'-dichloro-4'-sulphophenyl)-3-methyl-4-(5'-amino-2'-sulfphophenylazo)-5-pyrazolone. | Yellow. |
| (4) | 2-amino-6-phenylazo-5-napththol-2':7-disulphonic acid. | Orange. |
| (5) | 1-phenyl-3-methyl-4-(5'-amino-2'sulphophenylazo)-5-pyrazolone. | Yellow. |
| (6) | 2-(4'-amino-5'-methoxy-2'-methylphenylazo)-naphthalene-4:8-disulphonic acid. | Do. |
| (7) | 2-(2'-acetylaminophenylazo)-napthtalene-1:5-disulphonic acid. | Do. |
| (8) | 2-(2'-methylphenylazo)-naphthalene-5:7-disulphonic acid. | Do. |
| (9) | 4-amino-3'-hydroxy-4'-carboxy-2-methylazobenzene. | Do. |
| (10) | 4-nitro-4'-(4''-aminophenylazo)stilbene-2:2'-disulphonic acid. | Do. |
| (11) | 4-chloro-4'-(4''-methylaminophenylazo)sitlbene-2:2'-disulphonic acid. | Do. |
| (12) | 4-amino-2-methyl-4'-(6''-methyl-2''-benzthiazolyl) azobenzene-2':7''-disulphonic acid. | Do. |
| (13) | 4-amino-4'-phenylazo-2-methylazobenzene-2':4''-disulphonic acid. | Do. |
| (14) | 4-amino-1:2'-azonaphthalene-4':6:3'-trisulphonic acid. | Do. |
| (15) | 4-amino-2-acetylaminoazobenzene-2':4'-disulphonic acid. | Do. |
| (16) | 1-(4'-amino-2'-methylphenylazo)naphthalene-3:6:8-trisulphonic acid. | Do. |
| (17) | 1-(4'-amino-2':5'-dimethoxyphenylazo)naphthalene-3:6-disulphonic acid. | Do. |
| (18) | 4-amino-1-phenylazonaphthalene-2':5':6-trisulphonic acid. | Do. |
| (19) | 1-(2'-methylphenyl)-3-carboxy-4-(4''-aminophenylazo)-5-pyrazolone-2''-sulphonic acid. | Do. |
| (20) | 1-phenyl-3-methyl-4-(4''-aminophenylazo)-5-pyrazolone-2'':4'-disulphonic alid. | Do. |
| (21) | 1-(3'-aminophenyl)-3-carbomethoxy-4-phenylazo-5-pyrazolone-2'':4'-disulphonic aicid. | Do. |
| (22) | 4-amino-4'-[3''-methyl-4'''-(2''''-napthtlazo)-5''-pyrazolon-1''-yl]stilbene-2:2':1''''':5''''-tetra sulphonic acid. | Do. |
| (23) | 4-nitro-4'-[3''-methyl-4''-(5'''-aminophenylazo)-5''-pyrazolon-1''-yl]stilbene-2:2':2'''-trisulphonic acid. | Do. |
| (24) | 1-(4'-aminophenyl)-3-methyl-4-(2''-naphthylazo)-5-pyrazolone-1'':3':5'-trisulphonic acid. | Do. |
| (25) | 3-carboxy-4-(4'-aminophenylazo)-5-pyrazolone-2'-sulphonic acid. | Do. |
| (26) | The copper complex of 4-amino-4'-[3''-methyl-4''-(2'''-carboxyphenylazo)-5''-pyrazolon-1''-yl]stilbene-2:2':4'''-trisulphonic acid. | Do. |
| (27) | 1-amino-7-phenylazo-8-hydroxynaphthalene-2':3:6-trisulphonic acid. | Bluishred. |
| (28) | 2-amino-6-(4'-methoxyphenylazo)-5-hydroxynaphthalene-2':7-disulphonic acid. | Scarlet. |
| (29) | 2-methylamino-6-(4'-methoxyphenylazo)-5-hydroxynaphthalene-2':7-disulphonic acid. | Do. |
| (30) | 2-amino-7-(4'-methoxyphenylazo)-8-hydroxynaphthalene-2':6-disulphonic acid. | Red. |
| (31) | 4-amino-1-[4''-(phenylazo)phenylazo]naphthalene 2':4'':6-trisulphonic acid. | Yellowish brown. |
| (32) | 8-amino-1-hydroxy-2:2'-azonaphthalene-1':3:6-trisulphonic acid. | Bluish red. |
| (33) | 6-methylamino-1-hydroxy-2:2'-azonaphthalene-1':3:5'-trisulphonic acid. | Orange. |
| (34) | 1-amino-8-hydroxy-7-(2'-methoxy-4'-phenylazo-5''-methylphenylazo)naphthalene-2'':3:6-trisulphonic acid. | Navy blue. |
| (35) | 1-(3'-aminobenzoylamino)-8-hydroxy-7-(2''-methoxy-4''-phenylazo-5''-methylphenylazo)-naphthalene-2''':3:6-trisulphonic acid. | Blue. |
| (36) | 1-n-butylamino-8-hydroxy-7-(2'-methoxy-4'-phenylazo-5'-methylphenylazo)naphthalene-2'':3:6-trisulphonic acid. | Do. |
| (37) | 1-(3'-aminophenyl)-3-carboxy-4-(2''-methoxy-4''-phenylazo-5''-methylphenylazo)-5-pyrazolone-2''':4'-disulphonic acid. | Red. |
| (38) | 1-acetylamino-8-hydroxy-7-(5'-aminophenylazo)-naphthalene-2':3:6-trisulphonic acid. | Do. |
| (39) | 1-phenylamino-8-hydroxy-7-(4'-aminophenylazo)naphthalene-2':3:6-trisulphonic acid. | Navy blue. |
| (40) | 1-phenylamino-8-hydroxy-7-(5'-aminophenylazo)naphthalene-2':3:6-trisulphonic acid. | Violet. |
| (41) | 1-hydroxy-2-(5'-aminophenylazo)naphthalene-2':3:6-trisulphonic acid. | Orange. |
| (42) | 2-hydroxy-1-(5'-aminophenylazo)naphthalene-2':6:8-trisulphonic acid. | Yellow orange. |
| (43) | 1-hydroxy-2-(4'-aminophenylazo)naphthalene-3:6:8-trisulphonic acid. | Bluish red. |
| (44) | 2-hydroxy-1-(4'-aminophenylazo)naphthalene-6:8-disulphonic acid. | Scarlet. |
| (45) | 2-phenylamino-8-hydroxy-7-(4''-amino-2''-carboxyphenylazo)-3':6-disulphonic acid. | Brown. |
| (46) | 1-phenylamino-8-hydroxy-7-(4'-amino-2'-carboxyphenylazo)-3:6-disulphonic acid; when after-coppered on the fibre. | {Blue. Greenish blue. |
| (47) | The 1:2-chromium complex of 7-amino-6'-nitro-1:2'-dihydroxy-2:1'-azonaphthalene-3:4'-disulphonic acid. | Grey. |
| (48) | The copper complex of 2-amino-5:2'-dihydroxy-6-phenylazonaphthalene-1:5':7-trisulphonic acid. | Rubine. |
| (49) | The copper complex of 1-amino-8:2'-diphydroxy 7-(3'-chlorophenylazo)naphthalene-3:5':6-trisulphonic acid. | Violet. |
| (50) | The copper complex of 1-amino-8:2'-dihydroxy-7-[4'-(phenylazo)phenylazo]naphthalene-2'':3:6-trisulphonic acid. | Greenish blue. |

| | Aminoazo compound | Shade |
|---|---|---|
| (51) | 2-(8'-amino-1'-hydroxy-2'-naphthylazo)-5-(2''-hydroxy-1''-naphthylazo)-1-carboxybenzene-3':3'':6':6''-tetrasulphonic acid; when after-coppered on the fibre. | Reddish blue. Blue. |
| (52) | The copper complex of 3:3'-dimethoxy-4-(6''-amino-1''-hydroxy-2''-naphthylazo)-4'-(1'''-hydroxy-2'''-naphthylazo)diphenyl-3'':3''':-6''':8'''-tetrasulphonic acid. | Navy blue. |
| (53) | The copper complex of 2-amino-5-hydroxy-6-(5'-sulphamyl-2'-hydroxyphenylazo)naphthalene-7-sulphonic acid. | Rubine. |
| (54) | The copper complex of 2-methylamino-8-hydroxy-7-(5'-ethanesulphonyl-2'-hydroxyphenylazo)naphthalene-7-sulphonic acid. | Bluish red. |
| (55) | The copper complex of 6-methylamino-6'-nitro-1:2'-dihydroxy-2:1'-azonaphthalene-4':7-disulphonic acid. | Do. |
| (56) | The 1:1-chromium complex of 2-amino-5-hydroxy-6-(2'-carboxyphenylazo)naphthalene-sulphonic acid. | Reddish brown. |
| (57) | The 1:2-chromium complex of 1-amino-7-(4'-nitrophenylazo)-2':3-dihydroxynaphthalene-3:6-disulphonic acid. | Blue. |
| (58) | The 1:2-cobalt complex of 2-(4'-aminophenyl-amino)-6-(5''-chlorophenylazo)-2''-7-dihydroxynaphthalene-3':3'':7-trisulphonic acid. | Orange. |
| (59) | The 1:2-chromium complex of 1-(3'-aminophenyl)-3-methyl-4-(2''-hydroxy-1''-naphthylazo)-5-pyrazolone-4':4''-disulphonic acid. | Red. |
| (60) | The 1:2-chromium complex of 2-phenylamino-6-(3'-nitrophenylazo)-2':5-dihydroxynaphthalene-5':7-disulphonic acid. | Purple. |

*Example 61*

A solution of 2.42 parts of dry potassium thiocyanate in 35 parts of acetone is added gradually at 5° C. to a well stirred solution of 4.65 parts of cyanuric chloride in 35 parts of acetone. The mixture is stirred for 2 hours, filtered and the potassium chloride on the filter is washed with a little acetone. To the solution of 2:4-dichloro-6-thiocyano-s-triazine so obtained there is added a solution in 200 parts of water of 14.25 parts of the trisodium salt of the amino azo compound 1-amino-8-hydroxy-7-(phenylazo)naphthalene-2':3:6-trisulphonic acid, obtained by hydrolysing the product obtained by coupling diazotised aniline-2-sulphonic acid with 1-acetylamino-8-naphthol-3:6-disulphonic acid; 2.65 parts of sodium carbonate were added and the mixture is stirred for 18 hours at 20° C. Sodium chloride is added to the extent of 100 grams per litre and the precipitated dyestuff is filtered off, washed well with acetone, and dried. The azo dyestuff obtained contains nitrogen, sulphur and chlorine in the ratio of 7:3.65:1.0 (which theoretically should be 7:4:1), indicating that the dye contains one chlorine atom and substantially one thiocyano group attached to the triazine ring.

When cotton fabric is padded with a solution of the dyestuff and then after treated with a solution containing salt and alkali and steaming, red dyeings with good fastness to washing and moderate fastness to light are obtained.

If in the isolation of the dyestuff there is added to the filter cake 3 parts of a mixture of sodium-N:N-diethyl-metanilate and sodium hydrogen sulphate, mixed in the ratio of 15 to 1 there is obtained a dye of superior stability as demonstrated by its improved dyeing characteristics when it is applied to cellulosic materials by the above method.

*Example 62*

A solution of 11.4 parts of dry potassium thiocyanate in 200 parts of acetone is added to a solution of 21.6 parts of 2:4-dichloro-6-methoxy-s-triazine in 300 parts of acetone. The mixture is warmed to 40° C. and stirred at this temperature for 1 hour, filtered and the potassium chloride on the filter is washed well with acetone. The solution of 2-chloro-4-methoxy-6-thiocyanotriazine so obtained is added to a suspension of 46.5 parts of the disodium salt of the compound obtained by coupling 2-naphthylamine-4:8-disulphonic acid with m-toluidine together with 8.4 parts of sodium hydrogen carbonate. The mixture is heated to 40° C. and is stirred at this temperature for 20 hours. After cooling to 20° C. the product is filtered off, washed well with acetone. The filter cake was mixed with 8.0 parts of a mixture, in the ratio of 15:1 by weight, of sodium-N:N-diethylmetanilate and sodium hydrogen sulphate and then dried at 60° C.

When cotton fabric is padded with a solution of the dyestuff and alkali, dried and then steamed, yellow shades are obtained.

*Example 63*

A solution of 2.04 parts of potassium thiocyanate in 20 parts of dry acetone is added to a well stirred solution of 1.94 parts of cyanuric chloride in 16 parts of dry acetone at room temperature. The potassium chloride which separates, is removed by filtration and the resulting solution added in approximately 10 minutes to a stirred solution of 5.33 parts of the disodium salt of 1-amino-4-(4'-amino)anilinoanthraquinone-2:3'-disulphonic acid in 150 parts of water, the pH of the mixture being maintained at from 6 to 7 during the addition by the simultaneous addition of normal sodium hydroxide solution. The mixture is then stirred for 1 hour at about 10° C. the pH being maintained between 6 and 7 during this period, and is then filtered. Sodium chloride equivalent to a concentration of 50 grams per litre is added to the filtrates and the mixture is stirred until separation of the dyestuff is complete. The dyestuff is finally filtered, washed on the filter with 5% sodium chloride solution, then intimately mixed with 1 part of sodium metanilate buffer and dried at room temperature.

It colours cellulose in a greenish blue shade.

*Example 64*

56.3 parts of copper phthalocyanine-3-N-(3'-amino-4'-sulphophenyl)sulphonamide sulphonic acid, obtained as described below, are dissolved in 1500 parts of water and sufficient 2 N aqueous sodium hydroxide solution to give a solution of pH 7. This solution is cooled to below 10° C. and there is added dropwise the acetone solution of 2-chloro-4:6-dithiocyano-s-triazine obtained from 13.6 parts of cyanuric chloride by the method described in Example 1 and at the same time 2 N aqueous sodium carbonate solution so that the pH of the reaction mixture is maintained between 6.8 and 7.0. When the reaction is complete 12 parts of sodium diethylmetanilate are added and the mixture is then filtered. 400 parts of salt are added and the precipitated dyestuff is filtered off, mixed with 6 parts of sodium diethylmetanilate and dried.

This product when applied to cotton by padding through a solution of the dyestuff, followed by an aftertreatment with aqueous sodium hydroxide gives dyeings of greenish-blue shade and good fastness to washing.

The copper phthalocyanine-3N-(3'-amino-4'-sulphophenyl-)sulphonamide-sulphonic acid employed as starting material may be obtained as follows: 288 parts of copper phthalocyanine is converted to the tetrasulphon-chloride by the method described in Example 1 of United Kingdom specification No. 515,637 and the moist cake is suspended in 3000 parts of ice-water. 336 parts of sodium bicarbonate are added, then a solution of 188 parts of 2:4-diaminobenzene sulphonic acid in 1500 parts of water and 1000 parts of N aqueous sodium bicarbonate solution. The mixture is stirred for 18 hours, during which time the temperature is allowed to rise to 25° C., then the resulting blue solution is acidified by addition of 360 parts of 38% aqueous hydrochloric acid. The mixture is filtered and the solid residue is washed with 2 N aqueous hydrochloric acid and dried to give a blue powder.

*Example 65*

If in Example 64 the copper phthalocyanine-3-N-(3'-amino-4'-sulphophenyl)sulphonamide sulphonic acid is replaced by an equivalent quantity of copper phthalocyanine - 4-N-(3'-amino-4'-sulphophenyl)sulphonamide sulphonic acid (obtained by heating copper phthalocyanine-tetra-4-sulphonic acid in chlorosulphonic acid at 120° C.

for 4 hours, and reacting the sulphonchloride so obtained with 2:4-diaminobenzene sulphonic acid) a similar dyestuff is obtained.

*Example 66*

If in Example 64 the copper phthalocyanine-3-N-(3'-amino-4'-sulphophenyl)sulphonamide sulphonic acid is replaced by an equivalent quantity of copper phthalocyanine - 3 - N-(4'-amino-3'-sulphophenyl)sulphonamide sulphonic acid (obtained by condensing chlorosulphonated copper phthalocyanine with 2:5-diaminobenzene sulphonic acid) a similar dyestuff is obtained.

*Example 67*

If in Example 64 the copper phthalocyanine-3-N-(3'-amino-4'-sulphophenyl)sulphonamide sulphonic acid is replaced by an equivalent quantity of copper phthalocyanine - 4 - N-(4'-amino-3'-sulphophenyl)sulphonamide sulphonic acid (obtained by heating copper phthalocyanine-tetra-4-sulphonic acid with chlorosulphonic acid at 120° C. for 4 hours and reacting the sulphonchloride so obtained with 2:5-diaminobenzene sulphonic acid), a similar dyestuff is obtained.

*Example 68*

If in Example 64 the 2-chloro-4,6-dithiocyano-1,3,5-triazine is replaced by an equivalent amount of 2,4-dichloro-6-thiocyano-1,3,5-triazine a dyestuff having similar properties is obtained.

*Example 69*

If in Example 64 the copper phthalocyanine-3-N-(3'-amino-4'-sulphophenyl)sulphonamide sulphonic acid is replaced by an equivalent quantity of 3-amino-4-sulphophenyl aminomethyl copper phthalocyanine sulphonic acid (obtained as described below) a similar dyestuff is obtained, the dyeing being of somewhat greener shade than those given by the dyestuff of Example 64.

The 3 - amino - 4 - sulphophenylaminomethyl copper phthalocyanine sulphonic acid used in the above example may be obtained as follows:

75 parts of copper phthalocyanine are added at 20–30° C. during 2 hours to a stirred mixture of 106 parts of chlorosulphonic acid and 74 parts of sulphuric acid (monohydrate). Then 75 parts of paraformaldehyde are added during 2 hours. The mixture is heated to 85° C. and stirred for 16 hours, then cooled to 40° C. 68 parts of chlorosulphonic acid are added and the mixture is heated to 120° C. and stirred for 3½ hours.

The mixture is drowned in ice-water and the solid is filtered off, washed well with 2 N hydrochloric acid and drained. The solid is suspended in 1000 parts of 20% potassium acetate solution for 8 hours and then filtered off. Finally it is stirred with 1000 parts of 2 N hydrochloric acid and then filtered off, washed well with 2 N hydrochloric acid and dried. Analysis shows that the product is a mixture having the averaged constitution: $CuPo(SO_3H)_{1.7}(CH_2Cl)_{2.3}$.

10 parts of the above chloromethylated copper phthalocyanine sulphonic acid are stirred with 80 parts of water and N sodium hydroxide solution is added until the pH is 7. Then a solution of 17.3 parts of the sodium salt of metaphenylene diamine sulphonic acid in 100 parts of water is added. The mixture is stirred at 60° C. for 36 hours, cooled and 25 parts of concentrated hydrochloric acid are added. The precipitate is collected, well washed with 2 N hydrochloric acid and dried at 50° C. Analysis shows that this product contains approximately 1.6 metaphenylene diamine sulphonic acid residues.

What we claim is:

1. Water-soluble dyestuffs having the formula:

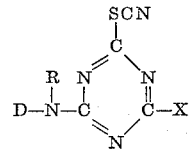

wherein X is selected from the group consisting of chlorine, lower alkoxy, and thiocyanato groups; D stands for a water-soluble chromophoric dyestuff radical selected from the class consisting of azo, anthraquinone, and phthalocyanine water-soluble chromophoric dyestuff radicals and attached to the nitrogen atom N through a nuclear carbon atom; and R is selected from the group consisting of hydrogen and lower alkyl.

2. Stabilized dyestuff compositions containing a water-soluble dyestuff having the formula:

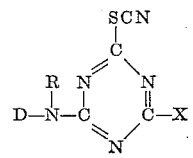

wherein X is selected from the group consisting of chlorine, lower alkoxy, and thiocyanato groups; D stands for a water-soluble chromophoric dyestuff radical selected from the group consisting of azo, anthraquinone, and phthalocyanine water-soluble chromophoric dyestuff radicals attached to the nitrogen atom N through a nuclear carbon atom; and R is selected from the group consisting of hydrogen and lower alkyl; and, as a stabilizer therefor, from about 2 to about 80% by weight of a buffer which gives an aqueous solution of pH about 5 to 8 and selected from the class consisting of mixtures of alkali metal acid salts of phosphoric acid and mixtures of diethylamino benzene sulphonic acids and the alkali metal salts thereof.

References Cited in the file of this patent

UNITED STATES PATENTS

| | | |
|---|---|---|
| 2,126,468 | Holzach et al. | Aug. 9, 1938 |
| 2,339,729 | Blackshaw et al. | Jan. 18, 1944 |
| 2,368,844 | Keller et al. | Feb. 6, 1945 |
| 2,891,941 | Fasciati et al. | June 23, 1959 |
| 2,892,828 | Stephen | June 30, 1959 |
| 2,892,829 | Stephen | June 30, 1959 |
| 2,892,830 | Stephen | June 30, 1959 |
| 2,892,831 | Stephen | June 30, 1959 |
| 2,940,812 | Denyer et al. | June 14, 1960 |